Figure 1:
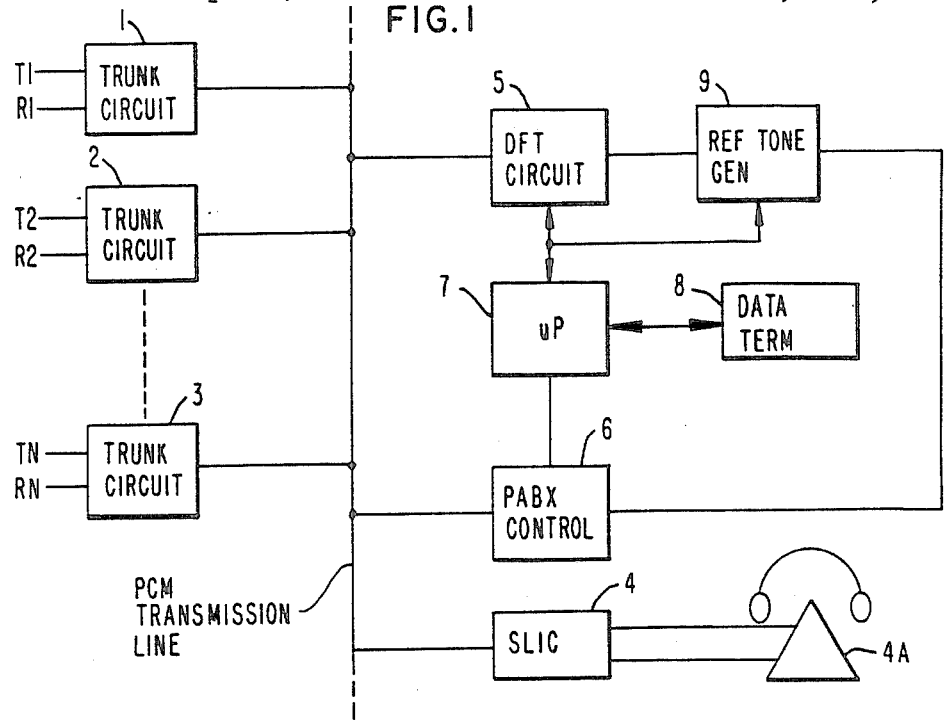

United States Patent [19]

Reesor et al.

[11] Patent Number: 4,694,482

[45] Date of Patent: Sep. 15, 1987

[54] DIGITAL TONE DETECTOR

[75] Inventors: Gordon J. Reesor, Nepean; Patrick R. Beirne; Zbigniew B. Styrna, both of Kanata, all of Canada

[73] Assignee: Mitel Corporation, Ontario, Canada

[21] Appl. No.: 921,526

[22] Filed: Oct. 22, 1986

Related U.S. Application Data

[62] Division of Ser. No. 705,679, Feb. 26, 1985.

[30] Foreign Application Priority Data

Nov. 9, 1984 [CA] Canada .................................. 467548

[51] Int. Cl.4 ............................................ H04M 1/24
[52] U.S. Cl. .......................................... 379/27; 379/6
[58] Field of Search ................. 379/6, 9, 32, 257, 282, 379/283, 351, 386, 27

[56]      References Cited
U.S. PATENT DOCUMENTS 4,327,258  4/1982  Zumbahlen, Jr. et al. ......... 379/6 X Primary Examiner—James L. Dwyer
Attorney, Agent, or Firm—Antonelli, Terry & Wands

[57]     ABSTRACT

A digital progess tone detector, for connection to a telephone line and a PABX, comprising circuitry for generating one or more reference tones having user definable frequencies and performing single frequency discrete Fourier transforms on one or more signals received from the telephone line at the defined frequencies, and providing an output signal to the PABX in response thereto. The output signal provides an indication of whether or not a predetermined one or more progress tone frequencies have been detected in the received signals. Because the generated reference tone frequencies are user definable, the present invention can be easily adapted for use in various foreign countries having different progress tone frequency requirements. A preferred embodiment of the invention is implemented on a single microcomputer chip in conjunction with peripherals (such as codecs, crosspoint switches, etc.). The progress tone detector is simple, small and inexpensive, thus conforming to the miniaturization and cost efficiency requirements of modern day PABX circuits.

2 Claims, 4 Drawing Figures

DIGITAL TONE DETECTOR

This is a division of application Ser. No. 705,679 filed Feb. 26, 1985.

This invention relates to telephone systems in general, and more particularly to a tone detector for detecting progress tones generated by a PABX or central office.

Modern day PABXs and central offices are required to detect various types of audio signals for communication with other PABXs or central offices. The most common of these signals are multi-frequency progress tones, such as dial, ring back, error and busy tones. The dial, ring back and busy progress tones are typically dual tone multi-frequency signals consisting of two simultaneously generated tones. Tone detection in the past has typically required distinguishing between high and low frequency tones of the received dual tone signals by filtering or digital counting techniques, described in further detail below.

One prior art tone detector utilizes a plurality of bandpass filters for detecting particular ones of the tone frequencies. Hence, the prior art tone detector requires as many bandpass filters as there are tone frequencies to be detected. The filters must have steep filter skirts, narrow bandwidths and be accurately tuned, in order that extraneous noise signals are not mistakenly detected as being valid progress tones. The prior art tone detector suffers from the disadvantage that it is not easily adapted for use in various countries having different progress tone frequency standards or requirements. In order to adapt the prior art tone detector for use in the various countries, the filters are required to be accurately retuned for detection of different progress tone frequencies, which typically requires careful adjustment of trim resistors etc., by a qualified technician. As a result of the accurate tuning, steep filter skirts and narrow bandwidth requirements, such prior art tone detectors are relatively expensive, particularly with respect to the cost of having qualified technicians tune them individually prior to shipment to the various countries or prior to being placed into local service.

Another prior art tone detector ulitizes a pair of zero crossing detectors and digital counters to determine the periods of received progress tones. The received tones are separated into high and low frequency tone groups by a pair of bandpass filters. The bandpass filters typically have less than ideal attenuation, such that each of the separated tone groups carry residual frequency energy from the other one of the tone groups. This, in addition to random noise due to cross talk etc., results in variation of the length of time between successive zero crossings of a received tone, a phenomenon known as "period jitter". High speed digital counters measure the length of time between, or the period of the successive zero crossings of the received tones in each of the separated tone groups. As a consequence of period jitter, the results of the digital counting are usually not consistent. A method of averaging the results eliminates some of the effects of period 3itter but occasionally allows received speech signals to be erroneously detected as progress tones.

Another prior art tone detector, described in Canadian Pat. No. 1,112,381 issued Nov. 10, 1981 to MITEL CORPORATION and entitled TONE DECODING CIRCUIT, utilizes circuitry for converting the period of each received progress tone into individual voltages having amplitudes which are proportional to the corresponding periods. The voltage amplitudes are compared with a predetermined plurality of voltage ranges. Correspondence of a voltage amplitude with one of the ranges results in production of an output signal, signifying the presence of a particular progress tone. The prior art MITEL tone detector overcomes certain of the disadvantages of the antecedent prior art tone detectors. Individual filters are not required, thus tuning of the circuit is made simpler by requiring adjustment of only one resistor for each of the voltage ranges, or by amplitude adjustment of the signal applied to the comparing circuitry. However, while the prior art MITEL device can be more easily tuned than the other mentioned prior art tone detectors, a skilled technician is still required to effect the adjustments. Also, the disadvantageous effects of period jitter are not completely eliminated by the prior art MITEL tone detector.

The present invention employs a single frequency discrete Fourier transform (DFT) technique for simultaneously detecting one or more progress tones. Fourier transform techniques have been used in the past for analyzing frequency spectrums of signals. For example, a fast Fourier transform (FFT) can be performed on an N point signal sample sequence in order to provide an indication of the relative amplitudes of harmonic components of the signal at N different frequencies.

This has been found to be an inefficient technique for detecting progress tones in a PABX, since progress tones are typically generated having disparate, non-harmonically related frequencies. Hence, a large number (N) of samples of the received signal are required in order that the FFT be calculated at frequencies close to the expected progress tone frequencies. In addition, in order to perform a FFT on a signal sample sequence, the entire sequence (of length N) must be stored prior to performing the FFT.

Cross correlation techniques have been used in the past for determining the delay of a signal which is hidden in additive noise. For example, in radar and sonar systems, a signal is transmitted and reflected from a target so as to be received after an unknown delay time. Measurement of the delay time provides information regarding the range of the target. A cross correlation can be performed between a stored version of the transmitted signal and the received signal. This involves storing a sequence of N samples of the transmitted and received signals, multiplying successive samples of the transmitted sequence by respective samples of the received sequence and summing the resulting product values. The received signal sample sequence is then phase shifted by a predetermined amount (i.e. one sample) and again multiplied by the transmitted sequence. The resulting product values are again summed, and the entire process is repeated until the received sample sequence has been shifted N times. The sum-of-products results provide an indication of the extent to which the transmitted and received signals are in phase at successive phase displacements (i.e. time delays). Hence, by analyzing the results for a plurality of time delays, the phase displacement between the transmitted and received signals, and hence the distance to the target from which the signals are reflected can be determined.

Because, in general, there is no correlation between the stored signal and any additive noise in the received signal due to the external environment etc., the correlation between the transmitted signal and the noise converges toward zero.

It has been found that FFT and cross correlation techniques require considerable memory for storing the signal sample sequences and considerable amounts of time for performing repeated sum-of-products calculations.

A discrete Fourier transform can be expressed according to the following formula:

$$X(k) = \sum_{n=0}^{N-1} x(n) \left[ \cos \frac{2\pi nk}{N} - j \sin \frac{2\pi nk}{N} \right]$$

where X(k) is a Fourier coefficient (real and imaginary) of a sampled signal x(n), calculated at a particular radian frequency coefficient $$"\frac{2\pi k}{N}"$$

and over a predetermined number of samples of x(n), given by "N", and denoted as the "run length". In order to simplify the subsequent description, the value $$"\frac{2\pi k}{N}"$$

will be abbreviated as "nF", where $$F = \frac{2\pi k}{N},$$

the frequency coefficient expressed in radians. The variable "n" denotes a particular one of the samples. The term "cos nF" represents a reference tone having frequency equal to the frequency of a progress tone to be detected, and "sin nF" is a phase shifted version of "cos nF".

According to the present invention, sine and cosine reference tones of equal frequency are generated for performing a single frequency DFT on an incoming signal from the PABX or central office. The frequency of the reference tone designates the frequency of the particular progress tone to be detected. If there is no correlation between the generated reference tones and the incoming signal, the result of the DFT converges toward zero, giving an indication that no progress tone has been detected. Likewise, if the incoming signal is comprised of one or more progress tones similar in frequency to the generated reference tones, the DFT produces a signal indicative of the progress tones having been detected.

In the present invention, cos nF represents a stored reference tone having frequency equal to the frequency of a predetermined progress tone to be detected and sin nF represents a 90° phase shifted version of the stored reference tone for determining phase shift characteristics of the received signal, described in greater detail below.

By performing the above mentioned single frequency DFT, the incoming signal is effectively band-pass filtered by a "digital" filter having a center frequency equal to the reference tone frequency and bandwidth approximately proportional to 1/N.

It is believed that DFT techniques have not hitherto been used for the detection of progress tones in telephone systems because of difficulties encountered in generating the above mentioned stored reference tone. In particular, it was thought that in order to generate a plurality of reference tones corresponding to each of the high and low frequency dual progress tones, samples of each of the high and low frequency tones would be required to be stored in separate digital memories, thereby necessitating as many memories as there are progress tones to be detected. The memories would be required to be of relatively large capacity (1k to 8k bytes) in order to store at least 1 cycle of each of the tones.

For example, a 480 Hz sinewave is used in North America to generate the "ring back" and "busy" progress tones. In order to generate sine (and cosine) tones having a frequency of 480 Hz at a sampling rate of 8 kHz, 16.66 samples of a single cycle of a sinewave (cosine wave) are required to be stored in the memory. However, it is well known that only an integral number of samples can be stored in a digital memory, such as a ROM. If 16.66 samples were to be approximated by rounding up to 17 samples, a tone having a frequency of 470.59 Hz would be generated. A DFT of a received progress tone having a frequency of 480 Hz at the generated reference tone frequency of 470.59 Hz, would converge toward zero. Hence, the tone would not be detected. In order to accurately generate the 480 Hz tone, it was thought that 1,666 samples of a single cycle of a sinewave would be required to be stored in the ROM, and sampled at a sampling rate of 8 kHz with a sampling increment of one hundred. Hence, a ROM having a memory capacity of at least approximately 2k bytes would be required.

In order to detect each of the progress tones using DFT techniques, it was thought that a plurality of reference tones would be required to be generated. Thus, a plurality of ROMs each having lengths of from 1k to 8k, would be required. Each ROM would generate a fixed frequency tone, and hence the tone detector would not be easily adapted for use in various countries having different progress tone frequency requirements.

As an alternative to the requirement of using a plurality of ROMs, it was thought that a single ROM, having large memory capacity, could be used. In order to increase or decrease the frequency of a generated tone, the sampling increment is typically increased or decreased, respectively. By increasing or decreasing the sampling increment by one sample, the frequency of the generated tone is increased or decreased by an amount known as the "frequency increment". The value of the frequency increment is given by dividing the sampling rate by the number of samples stored in the ROM. For example; the above-mentioned ROM, with 1666 stored samples, can generate tones having frequency increments of 4.8 Hz, when sampled at an 8 kHz sampling rate. In order to accurately generate all of the required progress tones at a sampling rate of 8 kHz a frequency increment of approximately 1 Hz would be required, necessitating an 8k ROM.

Thus, it was thought that in order to implement a digital tone detector using DFT techniques, a ROM having a large, (approximately 8k) capacity, or a plurality of smaller (approximately 2k) ROMs would be required, resulting in considerable circuit board area and memory capacity.

The present invention utilizes a technique for generating reference tones having programmable frequencies and a frequency increment of approximately 0.3 Hz from a single data memory requiring a memory capacity of typically only 256 bytes. Since the present invention requires no accurately tuned bandpass filters, the cost disadvantage of the first and second mentioned prior art tone detectors is overcome. Also, because the correlation of the generated reference tones and extraneous noise in the received signal converges toward zero, the prior art disadvantages resulting from period jitter are overcome.

The generated reference tones, according to the instant invention, are programmable over a wide frequency range. Hence, the present digital tone detector can be adapted for use in various countries having different progress tone frequency requirements by specifying particular frequency coefficient values.

In a preferred embodiment, the present invention is implemented in a single chip digital signal processor in conjunction with a microprocessor and peripherals (such as codecs, crosspoint switches, etc.). The resulting reduction in circuit complexity, circuit board space and cost over prior art tone detectors is in keeping with the miniaturization and cost efficiency requirements of modern day PABXs.

In general, the invention is a digital progress tone detector for connection to one or more signal transmission lines carrying one or more analog signals and to a PABX, comprising circuitry for receiving one or more analog signals from one or more signal transmission lines and generating one or more signal sample sequences in response thereto, and circuitry for performing discrete Fourier transforms on one or more of the signal sample sequences at one or more predetermined reference frequencies and generating and transmitting one or more output signals having magnitude parameters which are proportional to the amount of energy in respective ones of the analog signals at respective ones of the predetermined frequencies, to the PABX in response thereto.

More particularly, the invention is a digital progress tone detector for connection to a signal transmission line and a PABX, comprising circuitry for receiving an audio signal having a predetermined total amount of energy from a signal transmission line and generating a digital sample sequence in response thereto, and circuitry for generating digital sample sequences of one or more progress tone signals of predetermined frequencies. The invention is further comprised of circuitry for performing discrete Fourier transforms on the digital sample sequence of the received signal with respect to successive ones of the progress tone signal sample sequences and generating one or more digital correlation signals having magnitude parameters which are proportional to the amount of energy in the received signal at the predetermined frequencies, and circuitry for comparing the digital correlation signals with one or more threshold values and generating and transmitting one or more output signals to the PABX in response to a respective one or more of the correlation signal magnitude parameters being greater than respective ones of the threshold values. The output signals provide an indication of predetermined ones of the progress tone signals having been detected in the audio signal.

The invention is also a method for detecting progress tones on a signal transmission line, comprising the steps of receiving an analog signal having a predetermined total amount of energy from the signal transmission line and generating a digital sample sequence of the analog signal in response thereto, generating digital sample sequences of one or more progress tone signals having predetermined frequencies, performing discrete Fourier transforms on the digital sample sequence of the received signal with successive ones of the progress tone signal sample sequences and generating one or more digital correlation signals having magnitude parameters which are proportional to the amount of energy in the received signal at the predetermined frequencies in response thereto, and comparing the digital correlation signals with one or more threshold values and generating one or more output signals in response to predetermined ones of the correlating signals being greater than predetermined ones of the threshold values.

A preferred embodiment of the invention is a digital progress tone detector for connection to a plurality of signal transmission lines carrying one or more analog signals and to a PABX, comprising circuitry for receiving one or more analog signals having predetermined amounts of energy from a plurality of signal transmission lines and generating one or more signal sample sequences in response thereto, a digital signal processor for generating digital sample sequences of one or more progress tone signals having predetermined frequencies, performing discrete Fourier transforms on the received signals with respect to successive ones of the progress tone signal sample sequences and generating one or more digital correlation signals having magnitude parameters equal to the amount of energy in the received signal at the predetermined frequencies in response thereto, and a microprocessor for comparing the digital correlation signals with one or more threshold values and generating and transmitting one or more output signals to the PABX in response to magnitude parameters of the predetermined ones of the correlation signals being greater than predetermined ones of the threshold values, whereby the output signals provide an indication of predetermined ones of the progress tones having been detected in the audio signal.

Figure 3:
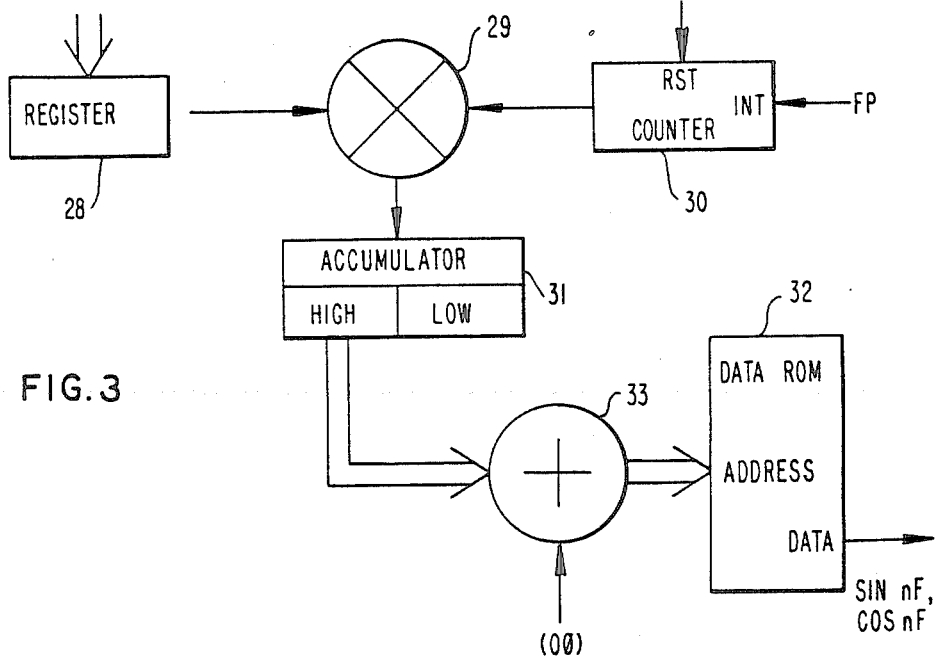
Figure 2:
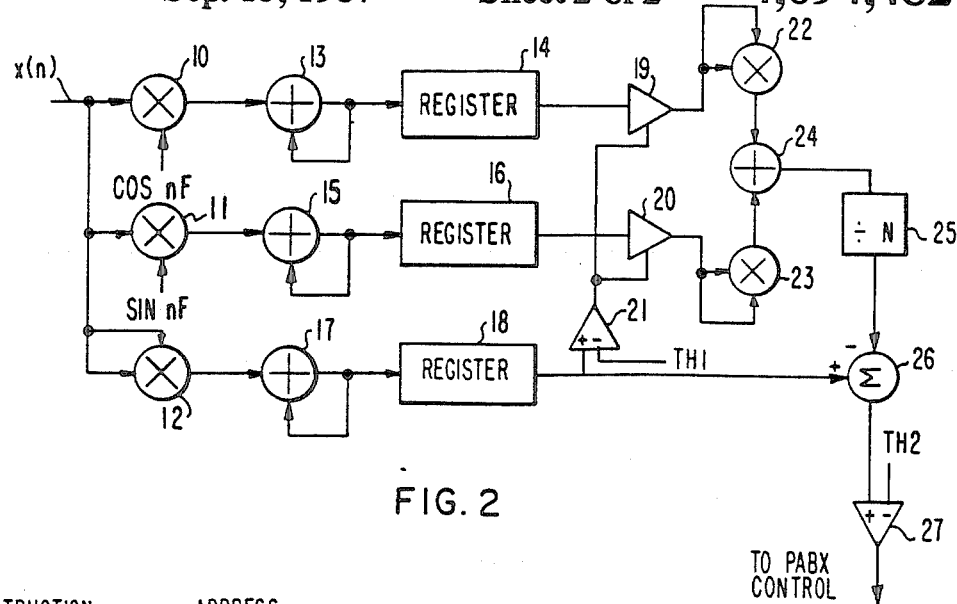
Figure 4:
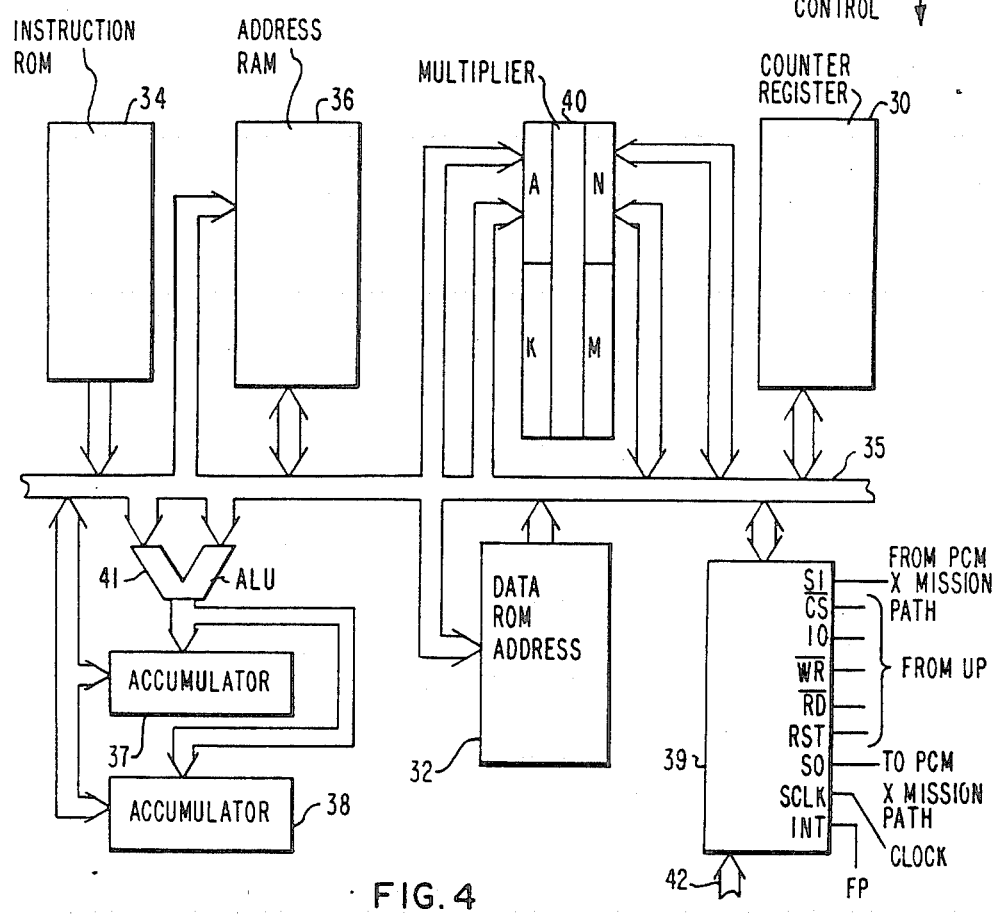

A better understanding of the invention will be obtained by reference to the description below, in conjunction with the following drawings, in which:

FIG. 1 is a block diagram illustrating the invention in its broadest form, connected to a plurality of telephone lines via a PCM transmission path and to a PABX control circuit, FIG. 2 is a block diagram illustrating functional components for implementing a DFT circuit according to the present invention, FIG. 3 is a block diagram illustrating functional components for implementing a reference tone generator according to the present invention, and FIG. 4 is a schematic block diagram illustrating a digital signal processor according to a preferred embodiment of the invention.

With reference to FIG. 1, signals carried by a plurality of telephone lines, denoted as $T_1R_1, T_2R_2 \ldots T_NR_N$, are received by trunk circuits 1, and 2 ... 3 respectively. Trunk circuits 1, and 2 ... 3 typically comprise analog-to-digital conversion circuitry for generating PCM sample sequences of the received signals. The PCM sample sequences are applied to a PCM transmission path for transmission to one or more telephone sets 4A via subscriber line interface circuits, such as SLIC 4, and to a DFT circuit 5, described in further detail with reference to FIG. 2. The PCM transmission path is typically comprised of a plurality of digital crosspoint switches for directing PCM sample sequences to one or more subscriber line interface circuits, such as SLIC 4, or trunk circuits, such as 1, and 2 ... 3 etc.

Modern day digital PABXs typically employ a time domain multiplexing scheme for transmitting PCM signal samples. For example, a serial stream of 32 8-bit PCM signal samples is typically said to comprise a PCM "frame". Hence, PCM signal sample sequences received from a particular one of circuits 1, and 2 . . . 3 are typically transmitted along the PCM transmission path during a particular one of the 32 time slots.

A PABX control circuit 6 supervises operation of the PABX and synchronizes the various frames of PCM samples, in conjunction with a microprocessor 7.

A data terminal 8, connected to microprocessor 7, is typically used for transferring data, such as frequency coefficient and run length etc., to the microprocessor.

A reference tone generator 9 is connected to DFT circuit 5, microprocessor 7 and control circuit 6. Generator 9 generates the aforementioned stored reference tones in response to receiving a frequency coefficient value from the microprocessor 7 and a frame pulse signal FP, from control circuit 6 described in greater detail below with reference to FIG. 3.

The present invention can perform line and trunk card diagnostics in response to generator 9 generating a series of PCM tone samples in the form of cos nF having known amplitude, to a subscriber line interface circuit such as SLIC 4, or trunk circuits such as 1 and 2 . . . 3. The line or trunk circuit receives and converts the series of PCM tone samples to an analog test tone signal having frequency cos nF, typically 1 kHz. In the event the line or trunk circuit is off-hook, a portion of the test tone signal is reflected from the telephone line or trunk according to predetermined echo return loss characteristics of the line or trunk. The reflected signals are reconverted into a series of PCM tone samples and transmitted to DFT circuit 5 via the PCM transmission path. Thus, by performing a DFT on the reflected signal samples with respect to the transmitted test tone samples, various amplitude, phase and distortion characteristics of the line or trunk circuit can be determined.

With reference to FIG. 2, a signal sample sequence x(n) generated by one of the line or trunk circuits 1, and 2 . . . 3 discussed with reference to FIG. 1, is applied to first inputs of multipliers 10 and 11, and first and second inputs of a multiplier 12. Multipliers 10, 11 and 12 are shown for the sake of convenience as being separate multipliers but can be, and in the preferred embodiment of the invention are realized as one multiplier to which the sample sequence is successively applied. The second inputs of multipliers 10 and 11 are connected to reference tone generator 9 (FIG. 1) for generating the aforementioned reference tones cos nF and sin nF described in further detail below with reference to FIG. 3.

Successive samples of the sequence x(n), applied to the first input of multiplier 10, are multiplied by successive samples of the reference tone sequence cos nF therein to yield a sequence of first product signals which are applied to a first input of an adder 13. An output of adder 13 is connected to a second input thereof such that a predetermined number, given by the run length N, of successive values of the first product signal are summed together to yield a first sum signal designated as REAL, which is stored in a first register 14. The run length N, and frequency coefficient F, are programmable and can be loaded into the microprocessor 7 via data terminal 8, described with reference to FIG. 1.

The sample sequence, x(n), is multiplied in multiplier 11 by the phase shifted version of the reference tone, sin nF, to yield a second sequence of product signals which are applied to a first input of adder 15. An output of adder 15 is connected to a second input thereof such that N successive ones of the second product signals are summed therein to yield a second sum signal designated as IMAG, which is subsequently stored in a second register 16.

In a similar manner, the sample sequence x(n) is squared in multiplier 12 to yield a sequence of third product signals which are applied to a first input of a third adder 17. An output of adder 17 is connected to a second input thereof such that N consecutive ones of the third product signals are summed together therein yielding a third sum signal designated as total energy, or T.E., which is subsequently stored in a third register 18.

Outputs of first and second registers 14 and 16 are applied to inputs of transmission gates 19 and 20 respectively, for transmitting the REAL and IMAG sum signals to additional circuitry, described in greater detail below.

The T.E. signal stored in third register 18 is compared with a predetermined threshold value, TH1, in a comparator circuit 21. Threshold value TH1 is typically generated by the microprocessor 7, and is user defined. An output of comparator 21 is connected to enable inputs of transmission gates 20 and 19 respectively. If the magnitude of T.E. is greater than TH1, the comparator circuit 21 generates and transmits an enable signal to transmission gates 19 and 20, which are enabled in response thereto.

The magnitude of T.E., stored in register 18, provides an indication of the total amount of energy present in the received analog signal, including voice signals and noise signals as well as progress tones. Comparator circuit 21 does not generate the enable signal in the event the magnitude of T.E. is less than TH1, (ie. the received signal is comprised only of noise), and transmission of the REAL and IMAG signals is thus inhibited as a result of gates 19 and 20 being disabled.

In the event the magnitude of T.E. is greater than the threshold value TH1, transmission gates 19 and 20 are enabled such that the REAL and IMAG signals are transmitted therethrough and applied to first and second inputs of fourth and fifth multipliers 22 and 23, respectively. The REAL and IMAG signals are squared in multipliers 22 and 23, yielding REAL$^2$ and IMAG$^2$ signals.

The REAL$^2$ and IMAG$^2$ signals are transmitted from respective outputs of multipliers 22 and 23 to first and second inputs of a fourth adder 31, and added together therein. An output of adder 31 is applied to a divider circuit 25, for dividing the sum of squares signal REAL$^2$+IMAG$^2$ by the run length value N, yielding a signal having an amplitude of (1/N) (REAL$^2$+IMAG$^2$). An output of divider circuit 25 is connected to the inverting input of a summing circuit 26. A non-inverting input of summing circuit 26 is connected to the output of the third register 18. The (1/N) (REAL$^2$+IMAG$^2$) signal provides an indication of the total amount of energy in the received signal at the frequency of the generated reference tone, and is subtracted and compared in summing circuit 26 from the value T.E. stored in register 18. Summing circuit 26 generates a difference signal in response thereto.

According to the well known Parceval's relation for a discrete Fourier transform:

$$\frac{1}{N} \sum_{F=0}^{N-1} |X(F)|^2 = \sum_{n=0}^{N-1} [x(n)]^2, \text{ where}$$

$$\sum_{F=0}^{N-1} |X(F)|^2 = \text{REAL}^2 + \text{IMAG}^2, \text{ and}$$

$$\sum_{n=0}^{N-1} [X(n)]^2 = \text{T.E.},$$

the total energy contained in a received signal is approximately equal to the squared magnitude of the Fourier coefficients of the signal divided by the run length N, in the absence of external noise and voice signals.

Alternatively, divider circuit 25 can be eliminated and an additional multiplier can be connected to the output of register 18 for multiplying the T.E. value by the run length N.

The (1/N) (REAL$^2$+IMAG$^2$) signal is subtracted from the value of T.E. in summing circuit 26, to provide an indication of the relative amount of energy at the frequency of the reference tone with respect to the total energy in the signal, including noise and voice energy.

The difference signal generated by summing circuit 26 is applied to a non-inverting input of a second comparator 27, and compared therein with a second threshold value TH2, generated by the microprocessor 7 (FIG. 1) and applied to an inverting input of comparator 27. In the event the difference signal is less than the second threshold value TH2, (ie. when the amount of energy in the received signal, at the reference tone frequency, is relatively large), comparator circuit 27 generates a signal to the PABX control circuit 6 (FIG. 1) indicative of the predetermined progress tone having been detected. Alternatively, in the event the difference signal is greater than the second threshold value TH2, (ie. when the amount of energy in the received signal at the progress tone frequency is relatively small), comparator circuit 27 generates an output signal to PABX control circuit 6 (FIG. 1) of the predetermined progress tone having not been detected.

Referring now to FIG. 3, a block diagram illustrating the functional components for implementing a phase-quadrature reference tone generator 9 described in FIG. 1, a fourth register 28 is connected to a first input of a sixth multiplier 29, a second input of which is connected to an output of a counter 30. register 28 is preferably parallel loadable from the microprocessor 7 (FIG. 1). Counter 30 can be reset or incremented in response to receiving a RESET signal from the microprocessor 7 and a frame pulse signal FP, from a PABX control circuit 6 (FIG. 1). The reset signal is received on an RST input and the frame pulse signal is received on an INT input of counter 30. The frame pulse signal FP is preferably generated at the beginning of each PCM frame.

In operation, a reset signal is generated by the microprocessor 7 and applied to the RST input of counter 30, thereby resetting the counter. Next, register 28 is loaded with a predetermined digital frequency coefficient value F, corresponding to a predetermined sampling increment for sampling a stored cosine wave, described in greater detail below.

The value stored in counter 30 is designated as n, which corresponds to the variable "n" discussed above with reference to FIG. 1, and is multiplied in multiplier 29 by the frequency coefficient value F stored in register 28, yielding a product value having a first plurality of high order bits and a second plurality of low order bits, PROD L. The low order bits, PROD L, are stored in an accumulator 31 connected to an output of multiplier 29. Accumulator 31 has an output connected in a circuit to a data ROM 32, for storing samples of a cosine wave.

In a preferred embodiment of the invention, ROM 32 stored 256, 13-bit samples of a single cosine wave cycle.

A predetermined number of the most significant bits of PROD L, designated as PROD LH, are applied to a first input of an adder 33, an output of which is connected to address inputs of ROM 32. A second input of adder 33 has a binary zero value applied thereto. Hence, ROM 32 is addressed with the value PROD LH, and a cosine wave sample (cos nF) is thereby produced at the data output thereof, for application to the second input of multiplier 10 (with reference to FIG. 2).

Next, the PROD LH value stored in accumulator 31, is added, in adder 33 to a phase shift value $-\phi$. The phase shift value is typically equal to one quarter of the address space of ROM 32. Hence, for 256 stored samples, $-\phi = -64$. The resulting sum, (PROD LH$-\phi$) is applied to the address input of ROM 32, for addressing a further sample of the cosine wave stored therein. By adding the value $-\phi$ to the PROD LH signal, the cos nF signal sample is effectively phase shifted by 90° to yield the sinewave sample, sin nF. The sin nF sample is applied to the second input of multiplier 11 (with reference to FIG. 1).

If no new frequency coefficient value F is received from the microprocessor 7 (FIG. 1), and applied to register 28, a new reference tone sample is generated (ie. when n is incremented) in response to counter register 30 receiving a frame pulse signal on the INT input thereof. The frequency coefficient value F stored in register 28 is then multiplied by the incremented value of n stored in counter register 30, and new cosine and sine reference tone samples, cos nF and sin nF, are thus generated.

The DFT circuit 5 (FIG. 1) described in detail with reference to FIG. 2 and the phase-quadrature reference tone generator 9 (FIG. 1) described in detail with reference to FIG. 3, operate in synchronism. As mentioned above, new reference tone samples (cos nF and sin nF) are generated in response to the value of "n" in counter 30 being incremented. At the same time, a new signal sample x(n) is received and multiplied by the new reference tone samples in multipliers 10 and 11. The entire process is repeated a predetermined number of times, as determined by the run length N.

The frequency of the generated sine and cosine reference tones resulting from sampling ROM 32, is dependent upon the frequency coefficient value F stored in register 28. The frequency coefficient value corresponds to the sampling increment between successive locations of ROM 32 addressed by the value PROD LH. According to the present invention, the frequency coefficient value represents a fractional sampling increment. The reference tone generator 9, illustrated in FIGS. 1 and 3, generates tones in response to sampling ROM 32 according to the fractional sampling increment. The sampling increment has successive instantaneous values which vary in accordance with a series of bit truncations described, by way of example, below. By using a fractional sampling increment, a small stored waveform table can be sampled so as to generate tones having small frequency increments between each other.

For instance, in order to generate the aforementioned 480 Hz tone from a 256 sample ROM, the ROM must be sampled at a fractional, or non-integral sampling increment of 15.36 samples. This is accomplished by loading a frequency coefficient value F, having a hexadecimal value of OF5C (corresponding to 15.36 decimal), in register 28. The value of F is multiplied by successive values of n stored in counter register 30, in order to generate the values PROD L and PROD LH as described above. However, by sampling locations of ROM 32 with PROD LH (the integer portion of PROD L), ie. by truncating the least significant bits to the right of the decimal (or hexadecimal) point, the ROM is sampled according to a varying sampling increment, the average value over time of which is equivalent to the non-integral sampling increment, 15.36.

Referring to TABLE 1 below, the resulting values of PROD L, PROD LH and S.I. (sampling increment) are listed for twelve successive values of n, according to the process outlined above with reference to FIG. 2. Hexadecimal equivalents of the decimal values are shown in parentheses.

TABLE 1

| n | PROD L | PROD LH | S.I. |
|---|--------|---------|------|
| 0 (0000) | 0(0000) | 0(00) | 15 |
| 1 (0001) | 15.36(0F5C) | 15(0F) | 15 |
| 2 (0002) | 30.72(1EB8) | 30(1E) | 15 |
| 3 (0003) | 46.08(2E14) | 46(2E) | 16 |
| 4 (0004) | 61.44(3D70) | 61(3D) | 15 |
| 5 (0005) | 76.80(4CCC) | 76(4C) | 15 |
| 6 (0006) | 92.16(5C28) | 92(5C) | 15 |
| 7 (0007) | 107.52(6B84) | 107(6A) | 15 |
| 8 (0008) | 122.88(7AE0) | 122(7A) | 15 |
| 9 (0009) | 138.24(8A3C) | 138(8A) | 16 |
| 10 (000A) | 153.60(9998) | 153(99) | 15 |
| 11 (000B) | 168.96(A8F4) | 168(A8) | 15 |
| 12 (000C) | 184.32(B850) | 184(B8) | 16 |

Thus, it can be seen from TABLE 1, that the sampling increment varies between 15 and 16, resulting in an average sampling increment of 15.36 (decimal). In a successful embodiment of the invention, one sample was generated every 125 microseconds, thus cosine and sine reference tones were generated having frequencies of 480 Hz.

With reference to FIG. 4, illustrating the functional components of a digital signal processor according to a preferred embodiment of the invention, an instruction ROM 34 is connected to an internal data bus 35, for controlling operation of a RAM 36, accumulators 37 and 38, a data ROM 32, a counter register 30, an input-/output port 39, a multiplier 40 and an ALU 41, all connected to the internal data bus 35. As discussed above, the digital signal processor can be any of a number of well known single chip digital signal processors. In a successful embodiment of the invention, the digital signal processor was an NEC microcomputer model 7720 signal processing interface.

Hence, with reference to FIG. 1, the separately described DFT and reference tone generator circuits 5 and 9, are preferably implemented in a single digital signal processor chip.

The microprocessor 7, referred to above can be any of a number of well known microprocessors, such as the Motorola 68000 microprocessor, etc.

In the successful embodiment of the invention, RAM 36, counter register 30, accumulators 37 and 38 and ALU 41 were capable of storing and arithmetically operating on 16 bit digital values. Internal data bus 35 was a 16 bit data bus, multiplier 40 was a 16 bit operand by 16 bit multiplicand, 31-bit parallel digital multiplier, and data ROM 32 contained 512 13-bit bytes of digital data. The first 256 bytes were comprised of samples of the aforementioned single cycle of a cosine wave, and the second 256 bytes comprised samples of a linear to $\mu$-law conversion table.

Data is transferred between the digital signal processor and the microprocessor 7 through an external 8 bit parallel data bus 42 connected to data terminals D0-D7 of input/output port 39 and corresponding data terminals of the microprocessor in response to predetermined signals on the RST, $\overline{CS}$, AO, $\overline{WR}$ and $\overline{RD}$ of input/output port 39. Inputs RST, $\overline{CS}$, AO, $\overline{WR}$ and $\overline{RD}$ are connected via a plurality of control lines to corresponding outputs of the microprocessor. $\overline{CS}$ is a chip select input enabling data transfer between the digital signal processor and the microprocessor via external data bus 42, in conjunction with the predetermined signals on the AO, $\overline{WR}$ and $\overline{RD}$ inputs.

Data is transmitted from the digital signal processor to the microprocessor via the external data bus 42. In order for the microprocessor to read data on the data bus 42, logic high signals are applied to the AO and $\overline{WR}$ inputs and logic low signal are applied to the $\overline{CS}$ and $\overline{RD}$ inputs. In order for the microprocessor to write data into the digital signal processor, logic high signals are applied to the AO and $\overline{RD}$ inputs and logic low signals are applied to the $\overline{CS}$ and $\overline{WR}$ inputs.

A serial data input/output clock input SCLK is connected to an external clock circuit, not shown, for generating a system clock signal of approximately 8 MHz. An INT input is connected to PABX control circuit 6 (FIG. 1), for receiving an approximately 8 kHz frame pulse signal for interrupting the digital signal processor in order to increment counter 30 every 125$\mu$sec, as discussed above.

A serial input port S.I. receives PCM signal samples from the PCM transmission path discussed with reference to FIG. 1. A serial output SO transmits PCM signals generated by the digital signal processor, to the PCM transmission path for performing the aforementioned "diagnostics".

Counter register 30 operates as described with reference to FIG. 3, and is connected to internal data bus 35 and stores the sixteen bit binary count value, n. The value of n is incremented after generation of each successive reference tone sample.

Multiplier 40 performs the functions of multipliers 10, 11, 12 and 29 discussed above with respect to FIGS. 2 and 3, and has four 16-bit internal registers; K, L, M and N. Internal registers K and L correspond to the first and second inputs of the above mentioned multipliers. Multiplier 40 multiplies the 16 bit values stored in the K and L registers and generates a 31 bit result in response thereto. The most significant 16 bits of the result are stored in the M register, and the least significant 15 bits of the result are stored in the N register. A zero is stored in the least significant bit of the 16 bit N register.

ALU 41 performs the functions of adders 13, 15, 17 and 33 discussed above and has two 16 bit inputs connected to internal data bus 35 and a 16 bit output connected to accumulators 37 and 38 which are in turn connected to data bus 35. ALU 41 adds two binary values received from the internal data bus 35 and generates a binary sum value in response thereto for application to one of accumulators 37 or 38. ALU 41 also exchanges high and low order bytes of a 16 bit binary value applied thereto, as described in greater detail below. Data ROM 32 operates as described above with reference to FIG. 3, and individual locations of RAM 36 perform the function of registers 14, 16, 18 and 28, in FIGS. 2 and 3.

The operations described with reference to FIG. 2, pertaining to elements 19 to 27, are performed in the microprocessor 7.

To initialize operation of the digital signal processor, a reset signal is generated by the microprocessor and applied to the RST input of input/output port 39, which resets counter register 30 and causes the microprocessor to implement a "wait" program loop in response to executing predetermined instructions stored in ROM 34. A frequency coefficient value F and a run length value N, generated by data terminal 8 via the microprocessor 7 (FIG. 1), are received from data bus 42 by input/output port 39 and loaded into predetermined memory locations of RAM 36.

The value F, stored in RAM 36, is multiplied in multiplier 40 by the value n (initially zero), stored in counter register 30. The least significant 15 bits of the resulting product value, (PROD L stored in register N of multiplier 40) are applied to the inputs of ALU 41. ALU 41 then performs a bit exchange operation whereby the high and low order bytes are exchanged and reapplied to data bus 35.

Data ROM 32 is addressed using the least significant 8 bits of data on the data bus 35. Hence, the most significant 8 bits of the low order portion of the result of the bit exchange operation are applied to the address input of data ROM 32. In this way, the value PROD L is truncated to yield PROD LH, as discussed above with reference to FIG. 3 and TABLE 1.

The PROD LH signal is then applied to an input of ALU 41 and added therein to the value $-64$ (decimal). The result is stored in accumulator 37 and transmitted via data bus 35 to the address input of ROM 32, for generating the sine sample, sin nF.

Analog-to-digital converters disposed in the trunk circuits 1, and 2 . . . 3, discussed above with reference to FIG. 1, typically generate sequences of $\mu$-law encoded PCM signal samples in response to receiving signals from the telephone lines. An incoming pCM signal sample sequence is received by the serial input S.I. of input/output port 39 and converted into a linear signal sample sequence in response to predetermined multiplication and addition being performed pursuant to execution of predetermined instructions stored in ROM 34, conversion from $\mu$-law to linear sample sequences is not described in detail but is well known to persons skilled in the art. As an alternative, $\mu$-law singal samples can be converted to linear in response to addressing a $\mu$-law to linear loop-up table.

The resulting linear sample sequence x(n) is generated and stored in the K register of multiplier 40. The reference tone sample cos nF stored in the L input of multiplier 40 is multiplied by a first sample of sequence x(n) therein, to yield a first product signal sample as discussed with reference to FIG. 2, which is stored in a first predetermined location in RAM 36. The x(n) sample is then multiplied by the sin nF sample in multiplier 40 and the resulting second product signal is stored in a second predetermined location in RAM 36. Next, the sample of x(n) is multiplied by itself, so as to be squared in multiplier 40 and the resulting third product signal sample is stored in a third location of RAM 36.

Next, the value n, stored in counter register 30, is incremented and the next signal sample of sequence x(n) is multiplied by the next reference tone sample cos nF in multiplier 40, yielding a further product signal sample which is added in ALU 41 to the first product signal sample stored in the first predetermined location of RAM 36. The resulting sum from ALU 41 is reapplied to the first predetermined location of RAM 36. Similar multiplications and additions are performed with respect to the signal sample sequence x(n), the next reference tone sample sin nF and the signal stored in the second and third predetermined locations of RAM 36. The first, second and third locations of RAM 36 correspond to registers 14, 16 and 18, with reference to FIG. 2.

The value of N stored in RAM 36 is decremented and the entire process is repeated until the value of N stored in RAM 36 has been decremented to zero. As a result, final values of REAL, IMAG and T.E. are stored in the first, second and third predetermined locations of RAM 36. The values of REAL, IMAG and T.E. are transmitted from the digital signal processor via data bus 42 to the microprocessor 7, as discussed above.

The microprocessor compares the T.E. value with the first threshold value TH1, discussed above with reference to FIG. 2. If the value of T.E. is greater than TH1, the microprocessor squares the values of REAL and IMAG and sums the result, yielding the $(REAL^2+IMAG^2)$ value. As discussed with reference to FIG. 2, the value T.E. is then multiplied by the value N, or alternatively the sum of squares value is divided by N in divider 25. The microprocessor then subtracts the $(REAL^2+IMAG^2)$ value from the N(T.E) value and compares the resulting difference value with the second threshold value TH2. In the event the difference value is greater than TH2, the microprocessor generates a signal to the PABX indicative of the predetermined progress tone having been detected, as discussed above with reference to FIG. 2.

Since, in the preferred embodiment of the invention, the received PCM signal samples are 8 bits, and the generated progress tone samples cos nF and sin nF are 13 bits in length, the REAL and IMAG values were scaled down by multiplying by a factor of $2^{-4}$ prior to being squared and divided by N.

The successful embodiment of the present invention was capable of performing simultaneous DFTs on from one to ten separate received PCM signal samples sequences, with respect to from one to ten different reference tones, on a per frame basis. Hence, up to ten different values of N and F could be stored in RAM 36 for performing tone detection of up to ten progress tones carried by up to ten received signals, each progress tone frequency being user definable. However, the invention requires only a single ROM for storing 256 samples of a cosine wave.

The frequency coefficient values are determined according to the formula: F=hex (128 * 256 * FREQ/8000), where F is a hexadecimal representation of the binary frequency coefficient value, and FREQ is the desired tone frequency. The number 256 corresponds to the number of samples in the stored cosine wave, and the number 8000 corresponds to the sampling rate of 8 kHz. The number 128 is a scale factor indicating that there are 7 bits of fractional resolution in the frequency coefficient values. Hence, in order to generate the 480 Hz progress tone, according to the preferred embodiment, a frequency coefficient of 1966 (07AE hexadecimal) is used, where 1966 equals 15.36 * 128. TABLE 2 is a list of particular ones of the generated tone frequencies and their corresponding hexadecimal frequency coefficients.

TABLE 2

| Tone | Frequency (Hz) | Hex Frequency coefficients |
| --- | --- | --- |
| 1 MW 1 kHz tone | 1000 | 1000 |
| dial tone | 350, 440 | 059A, 070A |
| busy tone | 480, 620 | 07AE, 09EC |
| ring back | 440, 480 | 070A, 07AE |
| Error | 440 | 070A |

The present invention can also be used to determine cadence information of a received tone. By comparing the results of a succession of DFTs of a received signal, having short run lengths N, cadence or frequency variation characteristics of the received tone can be detected and analyzed.

In summary, the invention is a digital progress tone detector having user definable tone detection frequencies, thereby overcoming the disadvantage of prior art tone detectors which required careful technical adjustment of trim resistors etc., in order to alter the tone detection frequencies.

The digital tone detector, according to the preferred embodiment of the present invention, is implemented on a single chip digital signal processor in conjunction with a microprocessor, thus overcoming the disadvantage of prior art tone detectors wherein a large number of circuit components, such as filters, counters and voltage divider networks, are required. However, the invention could also be implemented using dedicated logic by a person skilled in the art understanding this invention. The tone detector according to the present invention thus conforms to the miniaturization requirements of modern day PABXs.

A person understanding this invention may now conceive of changes or other embodiments using the principles described herein.

For instance, the various multiplications and additions described with reference to FIGS. 2, 3 and 4 can be performed simultaneously or in any convenient sequence, suitable modification being made to the sequence of instructions stored in ROM 34.

The values of N and F need not be loaded into microprocessor 7 via data terminal 8 but can be stored in a ROM or other memory circuits disposed in the microprocessor or connected thereto, and downloaded in response to initialization of the digital signal processor.

Also, the present invention is not limited to detection of the progress tone frequencies discussed with reference to TABLE 2, but can be used to detect tones having any user defined frequency. With reference to FIGS. 3 and 4, data ROM 32 can alternatively be loaded with 256 samples of a sinewave, the value $\phi$ being added to PROD LH, in adder 33, in order to generate the cos nF progress tone sample.

These and other changes or embodiments are all considered to be within the sphere and scope of the invention as defined in the claims appended hereto.

We claim:

1. A method for performing line circuit diagnostics on one or more line circuits, comprising the steps of:
   (a) generating and transmitting a digital sample sequence of a test tone signal having predetermined frequency to a line circuit of a PABX,
   (b) receiving a modified version of said sample sequence from said line circuit,
   (c) generating one or more further digital sample sequences of tone signals having frequencies harmonically related to said predetermined frequency, and
   (d) performing a discrete Fourier transforms on said received sample sequence with respect to said further digital sample sequences and generating one or more digital cross correlation signals for transmission to the PABX having magnitude parameters which are proportional to the amounts of energy in the received signal at said harmonically related frequencies,
   whereby said magnitudes of the correlation signals provide an indication of the status of internal circuitry of said one or more line circuits.

2. A method as defined in claim 1, further comprising the steps of comparing real and imaginary parts of said correlation signals and generating a further output signal to the PABX indicative of phase shift characteristics of said internal circuitry.

* * * * *